Feb. 9, 1971 C. J. GUNTHER 3,561,076
ROTARY ENGAGEABLE LEVER ACTUATED FASTENER ASSEMBLY
Filed March 21, 1969 2 Sheets-Sheet 1
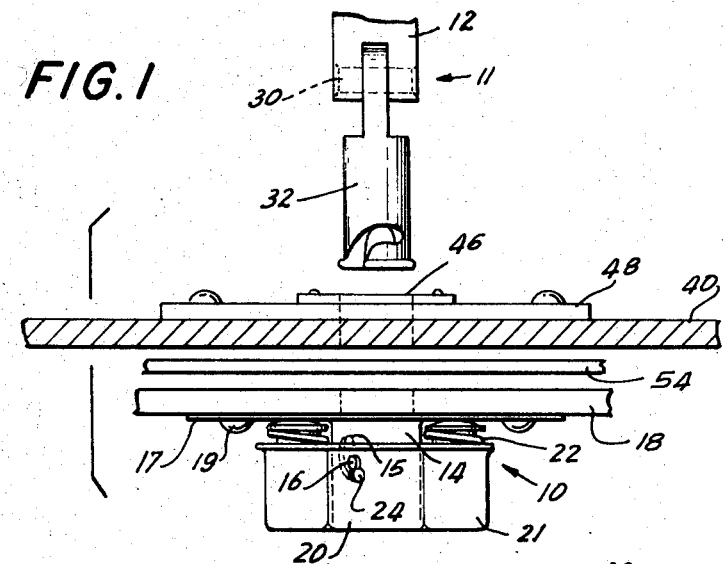
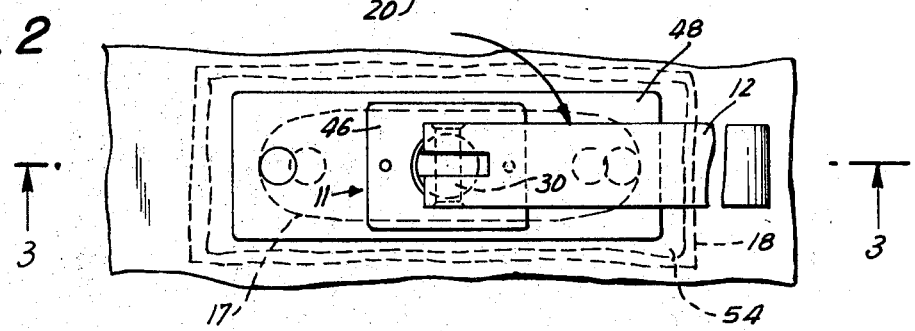
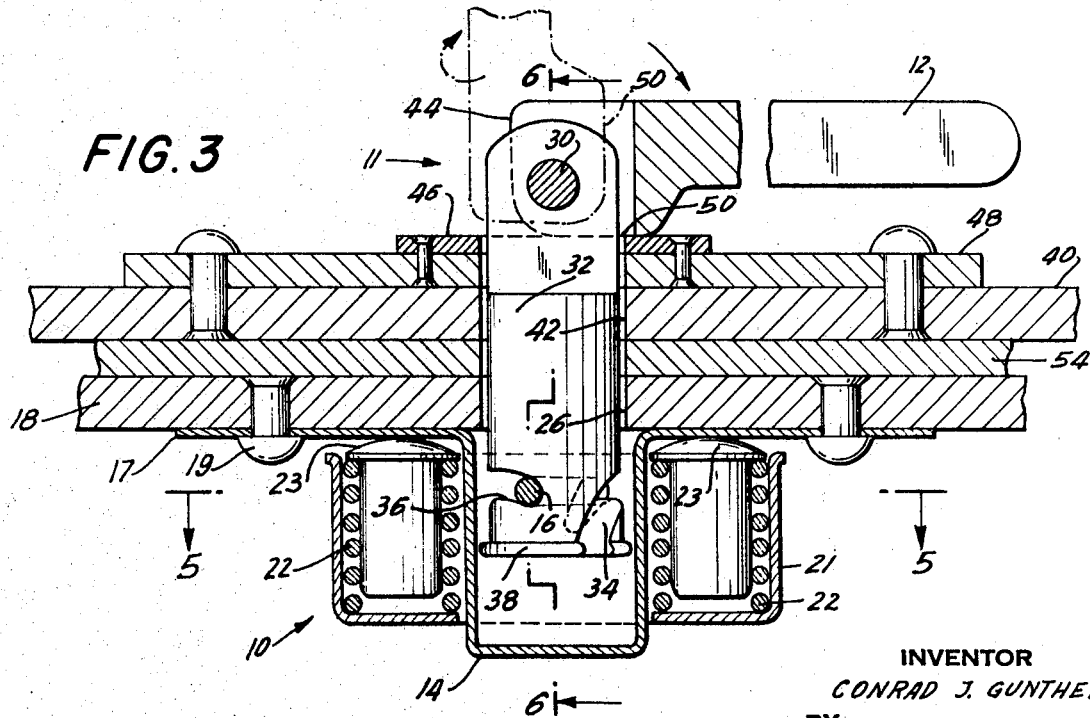
INVENTOR
CONRAD J. GUNTHER
BY
Daniel H. Kane
ATTORNEYS Feb. 9, 1971 C. J. GUNTHER 3,561,076
ROTARY ENGAGEABLE LEVER ACTUATED FASTENER ASSEMBLY
Filed March 21, 1969 2 Sheets-Sheet 2

INVENTOR
CONRAD J. GUNTHER
BY
Daniel H. Kane
ATTORNEYS

United States Patent Office 3,561,076
Patented Feb. 9, 1971

3,561,076
ROTARY ENGAGEABLE LEVER ACTUATED FASTENER ASSEMBLY
Conrad J. Gunther, Uniondale, N.Y., assignor to Dzus Fastener Co. Inc., West Islip, N.Y., a corporation of New York
Filed Mar. 21, 1969, Ser. No. 809,130
Int. Cl. A44b 17/00
U.S. Cl. 24—221                                3 Claims

ABSTRACT OF THE DISCLOSURE

A fastener assembly which includes interengageable receptacle and operating handle members in which the receptacle member has a relatively fixed supporting base portion, a detent portion including a crosspin or rod mounted on said base portion and spring means interposed between said base and detent portions with the detent portion being shiftable relative to the base portion from a normal position with the spring means being relatively expanded to a fastener locked position with the spring means relatively contracted. The operating handle is in turn provided with an operating lever portion shiftable between open and closed positions and also with a cam portion in the form of a stud, having a transverse spiral cam slot, pivotably depending from the lever portion. When the lever is in open position the cam portion can be engaged with the detent portion by inserting the spiral cam slot over the crosspin and rotating the entire operating handle assembly so that the slot and crosspin are interengaged. The fastener assembly is then locked by shifting the operating lever to closed position which in turn causes the detent portion to shift to relatively spring contracted position thereby holding the assembly in closed or locked position under spring tension.

BACKGROUND OF THE INVENTION

Quick acting fastening devices of various types are known in the art. Thus certain quick acting fastening devices consist of a stud member and receptacle member which are releasably interengageable when rotated through an arc of 90°. These quick acting, self-locking, rotatable fasteners have the disadvantage that when they are made for relatively high strength duty they require excessive locking and unlocking torque for their operation. This sometimes necessitates the use of special operating tools and, where the stud is provided with a screwdriver slot, the screwdriver slot becomes distorted and substantially unusable after repeated operations.

Another type of previously known fastener utilizes an operating lever which is pivoted upwardly and downwardly to open and close the fastener. These fasteners have frequently been unduly complicated in structure or they did not serve to secure the parts together under a high spring tension while also providing a fixed limitation upon the separation permitted between the parts. Also, in certain previously known fasteners utilizing an operating handle or lever, the cam portion which engages the detent is in the form of an open ended lever which is supposed to engage beneath the detent when the operating handle is shifted to closed position. Should the cam lever fail to engage beneath the detent the shifting of the operating handle will not lock the fastener.

SUMMARY OF THE INVENTION

It is an object of the present invention to combine the advantages of the quick acting, self-locking rotary fastener with the lever operated fastener and to provide a fastening device having separable receptacle and handle members wherein the locking and unlocking of the fastener is controlled by an operating lever which may readily be operated without the use of excessive force to either open or close the fastener. In this connection the handle member is provided with a cam portion which is preliminarily and positively engaged with a crosspn detent on the receptacle member by relative rotary motion and thereafter the fastener is locked by simply operating the handle or lever.

It is a further object to provide a fastening device of the indicated type of relatively simple mechanical construction in which the parts are held, while in closed position, under relatively high spring tension and wherein the separation between the parts under load is held within predetermined limits.

The objects of this invention are accomplished by providing a fastener assembly comprising a receptacle member and a handle member. The receptacle member has a relatively fixed supporting base portion with a detent portion including a crosspin or rod mounted on the base and spring means interposed between the base and detent portions whereby the detent portion can be shifted from a position with the spring means being relatively expanded to a position with the spring means relatively contracted. The operating handle in turn is provided with an operating lever shiftable between open and closed positions and also with a cam portion in the form of a stud having a transverse spiral cam slot pivotably depending from the lever. The cam portion is preliminarily and positively engaged with the crosspin of the receptacle member by relative rotary motion and thereafter the fastener assembly is locked simply by pivoting the handle member to closed position.

BRIEF DESCRIPTION OF THE DRAWINGS

In the accompanying drawings:
FIG. 1 is a partially fragmentary, side elevational view of a fastener assembly together with the parts or plates to be fastened thereby and showing the assembly in open position;
FIG. 2 is a top plan view of the fastener assembly of FIG. 1 with portions thereof broken away or omitted;
FIG. 3 is a partially sectional side view of the fastener assembly in the direction of the arrows on the lines 3—3 of FIG. 2 with portion of the operating lever omitted and showing the assembly in closed position.

DETAILED DESCRIPTION OF A PREFERRED EMBODIMENT

Figure 4:
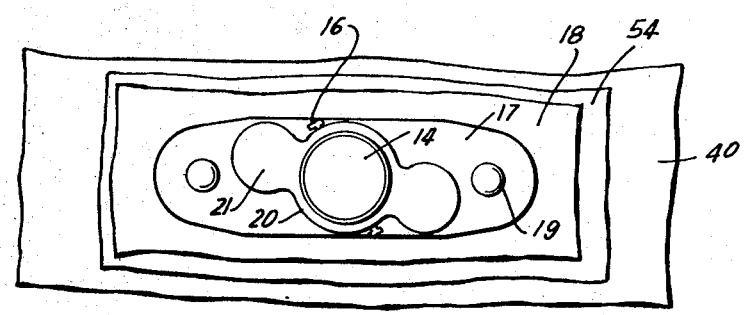
FIG. 4 is a bottom plan view particularly showing the receptacle member.
Figure 5:
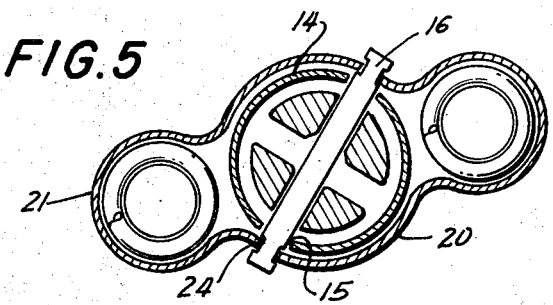
FIG. 5 is a sectional view in the direction of the arrows on the line 5—5 of FIG. 3.

The improved fastener assembly comprises a receptacle member 10 and a handle member 11 which are releasably interengageable with each other upon pivoting of the operating lever 12 of the handle member.

The receptacle member is of the type which has a detent portion which is normally urged towards open position by a spring mechanism and which may be engaged by the handle portion so as to be shifted against the tension of the spring to a closed position.

The illustrated embodiment comprises an inner shell 14 of cylindrical configuration having elongated longitudinally extending slots 15 on diametrically opposite sides thereof and through which the detent member or crosspin 16 extends for longitudinal shift movements in the slots. The cylindrical shell portion 14 is integral with a mounting base plate 17 having apertures extending therethrough whereby the receptacle member may be secured to a part to be fastened such as the frame member 18 by means of rivets 19.

Assembled around the inner shell 14 is the outer shell 20 which is of lesser height than the inner shell and can have telescopic movement with respect thereto. The outer shell member 20 has a central generally cylindrical portion 20 surrounding the cylindrical shell 14 and has two lobe portions 21 at opposite ends thereof with closed outer ends and which serve as housings for the helical spring members 22. Assembled with the helical spring members are the bearing members 23 which engage the mounting plate 17. Thus the spring and bearing members exert a force between the inner and outer shells tending to shift them apart to relatively unlocked position.

On diametrically opposite sides of the central portion of the outer shell 20 and in general alignment with the elongated slots 15 are the keyhole slots 24 which accommodate the reduced neck portions formed adjacent opposite ends of detent member or crosspin 16 and thus serve to retain the two shells, the springs and detent in assembled relationship.

In assembling the receptacle member the helical springs 22 and bearing members 23 are placed inside the spring housings 21 and the outer shell 20 is then telescoped over the inner shell 14. The crosspin or detent 16 is then inserted through the keyhole slots 24 of the outer shell and the elongated slots 15 of the inner shell. When inserting the crosspin 16 it is necessary to telescope the outer shell 20 inwardly over the inner shell 14 sufficiently so that the pin can be inserted through the enlarged end of one of the keyhole slots 24; thence through the two elongated slots 15 of the inner shell and thence through the enlarged end of the opposite keyhole slot.

Figure 6:
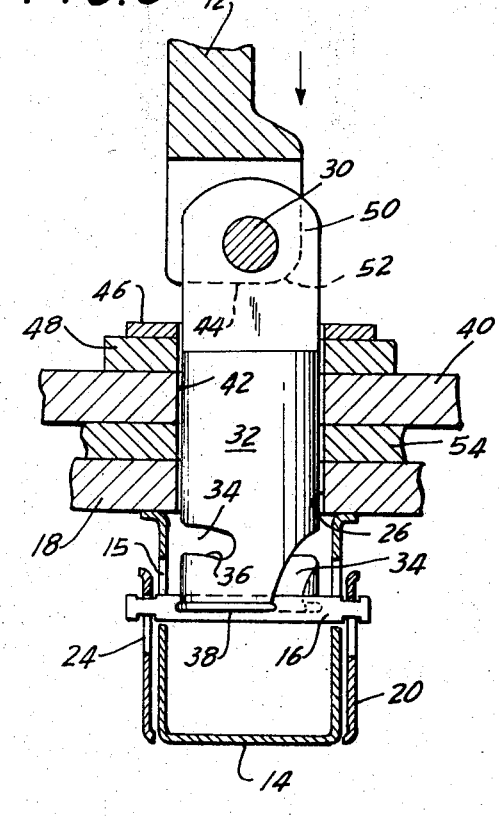
FIG. 6 is a transverse sectional view of the assembly in the direction of the arrows on the line 6—6 of FIG. 3 showing the assembly in open position and prior to the interengagement of the cam portion with the detent portion.
Figure 7:
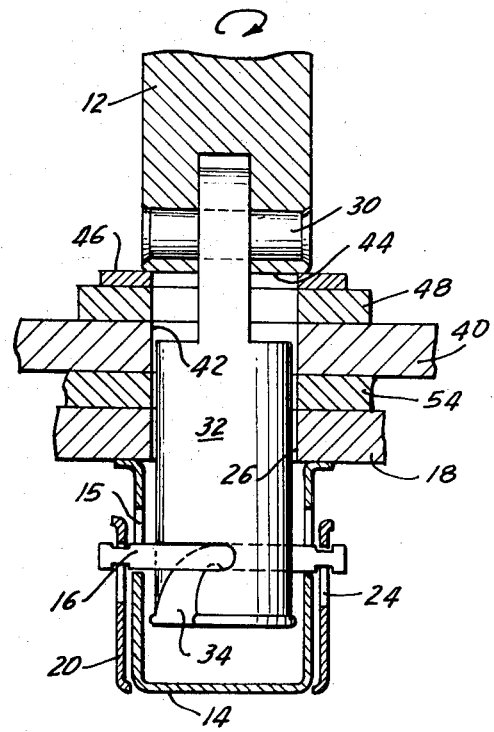
FIG. 7 is a view similar to FIG. 6 showing the handle rotated through 90° and with the cam portion interengaged with the detent portion but prior to the locking of the assembly.

Thereafter when the telescopic or compressive force on the outer shell is released, helical springs 22 expand so that the parts assume the position shown in FIGS. 6 and 7 with the reduced neck portions of crosspin 16 disposed in the reduced end portions of the keyhole slots 24 and with the body of the crosspin being disposed at the lower ends of the elongated slots 15. The position shown in FIGS. 6 and 7 represents the normal or unlocked position of the fastener assembly. In its locked position the crosspin 16 is shifted upwardly, as viewed in FIGS. 1, 3, 6 and 7, pulling the outer 20 in a similar telescopic manner thereby causing compression of the helical springs 22 as shown in FIG. 3.

In mounting the receptacle member 10, the base portion 17 is placed against the face of a frame or supporting plate 18 having an aperture in alignment with the central opening in shell 14. The supporting plate is also formed with a pair of mounting apertures in alignment with the mounting apertures in base plate 17 and the receptacle can be held in place as by means of rivets 19 extending through the mounting apertures.

The handle member 11 comprises the operating lever 12 which may be readily grasped in the hand to facilitate the interengagement, locking, unlocking and release of the fastener assembly. The lever 12 is free from connection at one end and is bifurcated at its opposite end. The bifurcated end is pivotably connected as shown at 30 to the reduced extension formed on the upper end of the cam portion 32. The cam portion is in the form of a tubular stud having helical cam slots 34 extending upwardly on diametrically opposite sides of the tubular stud from the lower end thereof and each terminating in a locking portion 36 at the inner or upper end thereof. The lower end of the stud may terminate in an external bead 38 as shown and this bead may serve to hold a retaining ring or washer (not shown) in captive relationship.

The fastener assembly may be used for holding any removable cover or plate in place as for instance the plate shown at 40 in the drawings. The lower end of cam portion 32 is inserted through an aperture 42 in the cover or removable plate 40 and the cam slots 34 are engaged over the detent or crosspin 16 in the position shown in FIG. 6. The handle portion 12 is then rotated in a clockwise direction causing the spiral cam slots 34 to interengage with the detent or crosspin 16 as shown in FIG. 7.

When the parts have thus been interengaged the cam surface 44 at the inner end of lever 12 engages against the wear surface provided by plate 46 which is secured to an attaching plate 48 which in turn is attached to the cover or removable plate 40 as shown most clearly in FIG. 7. All of these plates have apertures in registry with each other through which the cam portion or stud 32 may be inserted.

With the parts in the position shown in FIG. 7 the handle or lever 12 is then pivoted downwardly to the position shown in FIG. 3 causing the fastener assembly to be locked under spring tension.

In connection with the foregoing it will be noted that the inner end 44 of the lever 12 together with the side face 50 and connecting portion 52 form a developed cam surface and that the spacing of this surface from 44 through 52 to 50 from the pivot point 30 gradually increases. Thus when the handle is pivoted downwardly from the position shown in FIG. 7 to the position shown in FIG. 3 the stud or cam portion 32 will be shifted upwardly or outwardly with respect to the receptacle member 10 thereby causing crosspin 16 to be shifted upwardly with the result that outer shell 20 is telescoped with respect to inner shell 14 and compresses the two springs 22. The portion 50 of the cam surface is relatively flat so that when lever 12 is in the depressed or locked position as shown in full line in FIG. 3 it will be retained in that position due to the force exerted by the springs.

To unlock the fastener it is simply necessary to raise the handle 12 upwardly from the position shown in full lines in FIG. 3 to the position shown in FIG. 7 and in dotted lines in FIG. 3. To disengage the stud or cam member from the detent portion, handle 12 is then rotated in a counterclockwise direction to the position shown in FIG. 6.

In order for the fastener assembly to be operable in the manner described above, the spacing between the portion 44 of the cam surface must be very close to the wear surface 46 as shown in FIG. 7 when the stud or cam portion is interengaged with the detent portion by relative rotation. In order to obtain proper spacing an additional spacing plate may be inserted between the frame plate 18 and the removable cover or plate 40 as shown at 54.

When the fastener has been assembled as described above and then interengaged and locked, the fastened parts will be held together under the force exerted by the springs 22. Separation between the parts is limited by the interengagement between the crosspin 16 and the upper end of slots 15. The amount of fastening compression exerted by the fastener when in locked position can be varied by using springs 22 having different spring constants or compressive forces.

Thus it will be seen that an improved fastener assembly has been provided in which initial interengagement is obtained by relative rotary motion and in which the ultimate locking of the fastener is obtained by the pivoting of a locking lever or handle.

Having now described the invention, I claim:

1. A fastener assembly for use in removably fastening two parts together comprising:
   (a) a receptacle member for attachment to one of said parts having a relatively fixed supporting base portion, a detent portion including a crosspin mounted on said base portion, and spring means interposed between said base and detent portions, said detent portion including the crosspin being shiftable relative to the supporting base from a normal position where the spring means is relatively expanded to a locked position where the spring means is relatively contracted; and (b) a cooperating operating handle member for use with the other of said parts being interengageable with the receptacle member, said handle member having an operating lever portion, a stud portion connected to the operating lever so as to be shiftable thereby and said stud portion being formed with a cam slot extending inwardly from one end thereof terminating in a locking portion, said cam slot being interengageable with said crosspin when the handle member is rotated relative to the receptacle member, and said operating lever having a cam surface formed thereon adjacent the stud portion which is engageable with a surface associated with the other of said parts so that upon pivoting of the lever when the cam slot is interengaged with the crosspin the fastener assembly can be shifted between locked position with the spring means in relatively contracted condition and open position with the spring means in relatively expanded condition.

2. A fastener assembly as set forth in claim 1 in which the stud portion is pivotably connected adjacent one end of the operating lever and the cam surface is formed around that end of the operating lever and an adjacent face thereof.

3. A fastener assembly for use in releasable fastening two parts together as set forth in claim 2 in which the cam surface at the pivotably connected end of the operating lever and the cam surface at the adjacent face thereof are relatively flat so as to releasably retained the handle in either open or closed position.

References Cited

UNITED STATES PATENTS

| 2,547,155 | 4/1951 | Dzus | 24—221 |
| 2,585,241 | 4/1952 | Gunther | 24—221 |
| 2,887,753 | 5/1959 | Ralph et al. | 24—221 |

FOREIGN PATENTS

| 678,627 | 9/1952 | Great Britain | 24—221 |

STANLEY N. GILREATH, Primary Examiner

W. H. SCHROEDER, Assistant Examiner